United States Patent [19]

Lamb

[11] Patent Number: 5,739,627
[45] Date of Patent: Apr. 14, 1998

[54] ADJUSTABLE PERMANENT MAGNET COUPLER

[75] Inventor: Karl J. Lamb, Port Angeles, Wash.

[73] Assignee: Magna Force, Inc., Port Angeles, Wash.

[21] Appl. No.: 546,480

[22] Filed: Oct. 20, 1995

Related U.S. Application Data

[63] Continuation-in-part of Ser. No. 237,031, May 3, 1994, Pat. No. 5,477,094, which is a continuation-in-part of Ser. No. 65,867, May 21, 1993, Pat. No. 5,477,093.

[51] Int. Cl.⁶ .............................. H02K 7/10; H02K 7/06; H02K 49/00
[52] U.S. Cl. ............................ 310/750; 310/83; 310/84; 310/92; 310/103
[58] Field of Search .......................... 310/75 D, 103, 310/104, 105, 83, 106, 84, 92

[56] References Cited

U.S. PATENT DOCUMENTS

| | | | |
|---|---|---|---|
| 5,233,247 | 8/1993 | Stark | 310/83 |
| 5,376,862 | 12/1994 | Stevens | 310/75 D |
| 5,453,651 | 9/1995 | Kroner et al. | 310/209 |
| 5,483,114 | 1/1996 | Fenner | 310/75 D |
| 5,514,925 | 5/1996 | Worthington et al. | 310/103 |
| 5,514,926 | 5/1996 | Bushman | 310/105 |
| 5,539,266 | 7/1996 | Stevens | 310/75 D |

*Primary Examiner*—Thomas M. Dougherty
*Assistant Examiner*—Michael J. Wallace, Jr.
*Attorney, Agent, or Firm*—Seed and Berry LLP

[57] ABSTRACT

An adjustable coupler has a rotary magnet rotor with magnet modules gaps from electroconductive elements on an electroconductive rotor. The magnet modules each have two side-by-side permanent magnets with their respective poles reversed and have a neutral plane between the magnets. The magnet modules can be turned for torque adjustment between a maximum torque position in which the neutral planes intersect at the rotary axis of the coupler, and a minimum torque position at which the magnet modules are turned 90 degrees from the maximum torque position.

20 Claims, 7 Drawing Sheets

ADJUSTABLE PERMANENT MAGNET COUPLER

CROSS-REFERENCE

This application is a continuation-in-part of my application Ser. No. 08/237,031, filed May 3, 1994, issued Dec. 19, 1995 as U.S. Pat. No. 5,477,094 which in turn is a continuation-in-part of my application Ser. No. 08/065,867, filed May 21, 1993, issued Dec. 19, 1995, as U.S. Pat. No. 5,477,093.

TECHNICAL FIELD

The present invention relates to magnetic drives of the type in which a magnet rotor presents permanent magnets spaced from an electroconductive rotor. More particularly the invention is concerned with varying the torque transfer ability of permanent magnet couplers.

BACKGROUND OF THE INVENTION

In my referenced copending application a permanent magnet drive is shown in which permanent magnets on a magnet rotor are spaced by air gaps from electroconductive elements on a electroconductive rotor which are positioned on opposite sides of the magnet rotor. The magnets are arranged in groups of two magnets per group, and each group has the poles of its magnets reversed so that each group has poles of opposite polarity facing each of the electroconductive elements. Torque Changes are accomplished by varying the air gaps between the pole faces and the electroconductive elements. The present invention provides an alternative arrangement for torque changes which is independent of the air gaps and can be used for achieving a "soft start".

SUMMARY OF THE INVENTION

In accordance with the present invention the two side-by-side permanent magnets in each group are mounted as a magnet module in a respective circular holder which is turnable in a round pocket in the disc-like body of the magnet rotor. With this arrangement the neutral plane between the adjacent side faces of the two side-by-side magnets can be moved relative to the rotary axis of the magnet rotor by turning the holder from a maximum torque position where the neutral plane radiates from the rotary axis of the rotor to a minimum torque position in which the neutral plane is perpendicular to its maximum torque position.

In the simplest form of the invention the magnet modules are individually adjusted and locked in adjusted position as by a set screw. In a more complex arrangement the modules can be simultaneously turned to an adjusted position. Teeth can be provided on the holders meshing with a sun gear so as to turn simultaneously when one of the holders is turned or the sun gear is turned.

BRIEF DESCRIPTION OF THE DRAWINGS

FIG. 4-A through 4-C are elevational views of the magnet rotor with the cover plate removed showing, respectively, the maximum torque position, an intermediate torque position, and the minimum torque position of the magnet modules of the first embodiment;

DETAILED DESCRIPTION OF THE INVENTION

Referring to FIGS. 1-4, a first embodiment of the invention is shown applied to a coupler having an electroconductive rotor 9 and a magnet rotor 10 which is positioned midway between two electroconductive discs 11–12 provided by the electroconductive rotor and preferably having ferrous backing discs 13–14. The discs 11–12 are separated by three or more spacer sleeves 16 spaced equally circumferentially of the discs to define air gaps 17–18 between the discs 11–12 and the magnetic rotor 10. Extending through the backing disc 14, electroconductive disc 12, sleeves 16, electroconductive disc 11, and threaded into the backing disc 13 are respective tie bolts 20. The discs 11, 13 are secured by bolts 22 to a hub 24, and the magnetic rotor 10 is secured by bolts 26 to a hub 28. The hubs 24, 28 are in turn secured by tapered bushing fittings 30, 31 via keys 32, 33 to independent shafts 34–35, one of which is a powered input shaft and the other of which is an output shaft connected to a load. Suitable bearings support the shafts 34–35 independently of one another.

The magnetic rotor 10 comprises a primary disc 10a and a cover disc 10b which are held together by the bolts 26 and have a plurality of aligned circular openings 37–38 adjacent their periphery. Magnet modules 39 with magnet holders 40 occupy the openings 37–38. Each holder 40 has outer edges recessed to provide an annular outer land 41 retained between the cover disc 10b and a retaining lip 38a surrounding the respective opening 38. A rectangular cutout is provided in each holder to receive a pair of rectangular permanent magnets 42–43 which are positioned side by side with their opposing side faces having a neutral plane 44 therebetween and have their opposite poles facing toward the electroconductive discs 11–12. The poles of the magnets 42–43 are reversed relative to one another; i.e., the north pole of magnet 42 and the south pole of magnet 43 face in the same direction. The neutral plane 44 between the adjacent side faces of the magnets 42–43 is parallel to the rotary axis of the shaft 35 and at maximum torque performance (FIG. 4A) it includes this rotary axis. For minimum torque performance (FIG. 4-C) the magnet modules 39 are turned a quarter turn from the maximum performance position thereby positioning the neutral plane 44 to a position at which it is perpendicular to its position at maximum torque performance. Set screws 45 are screwed into threaded bores 46 extending radially from the periphery of the primary disc 10a for engaging the lands 41 of the holders to lock the magnet modules 39 in selected torque performance positions (FIG. 4-B, for example) between their maximum and minimum performance positions. The torque transfer ability of the first embodiment can not only be varied by turning all of the magnet modules 39 a like amount, but can also be varied by turning the magnet modules 39 different amounts. The holders 40 may have exposed sets of radial indicia which can register with indicia on the primary disc 10a or cover disc 10b to indicate the orientation of the magnet modules 39.

The magnet modules can be simultaneously turned for speed adjustment by providing each magnet holder with a planetary gear meshing with a central sun gear so that when the sun gear is turned, or one of the planetary gears is turned, all of the planetary gears are turned responsively a like amount.

Figure 1:
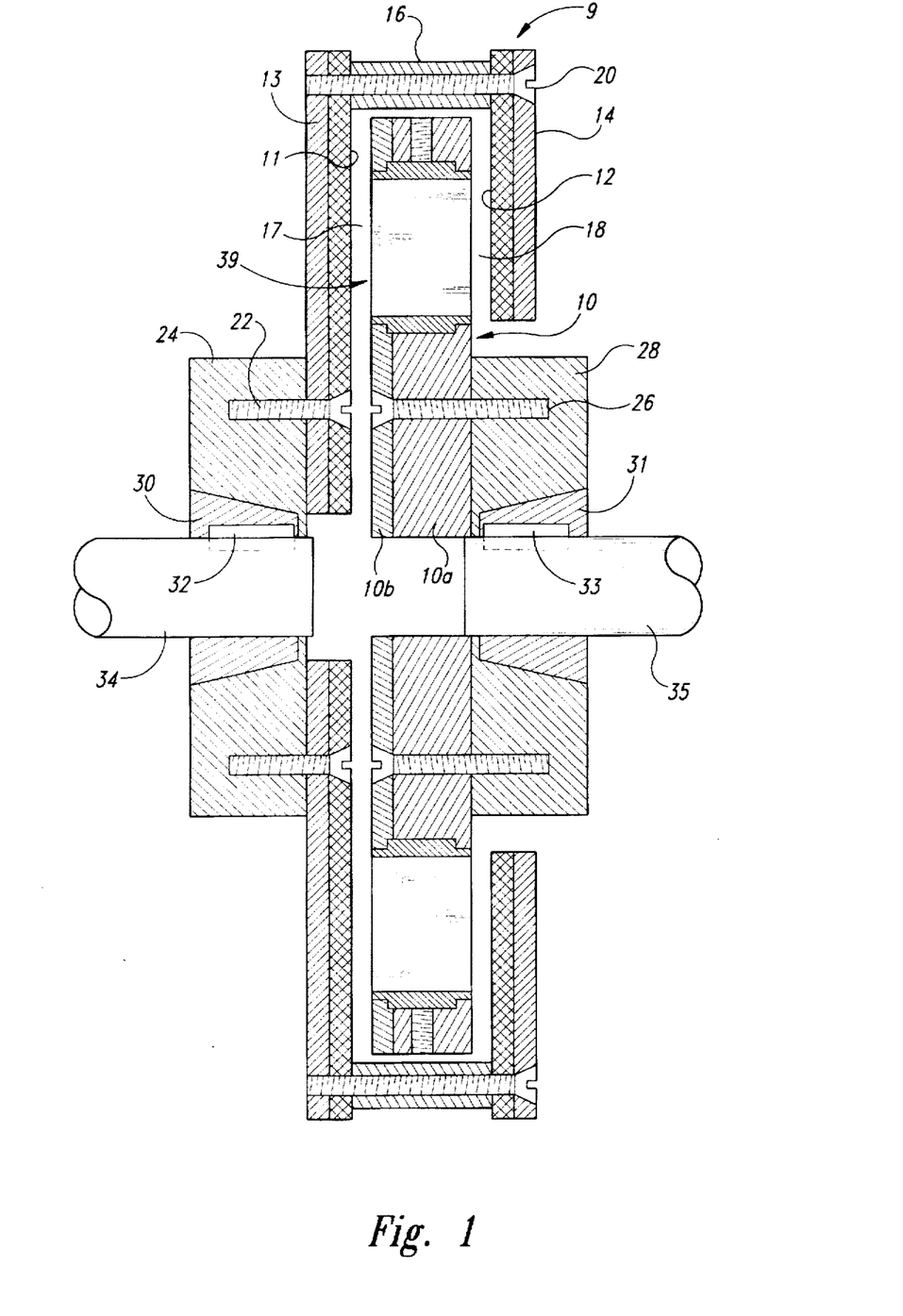
FIG. 1 is a vertical sectional view through a first embodiment of an adjustable coupler according to the present invention.
Figure 2:
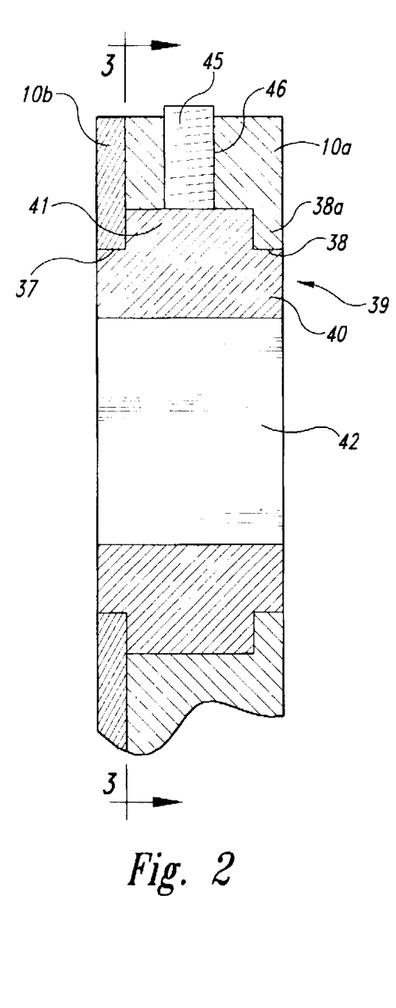
FIG. 2 is an enlarged vertical sectional view of part of the magnet rotor as viewed in FIG. 1.
Figure 3:
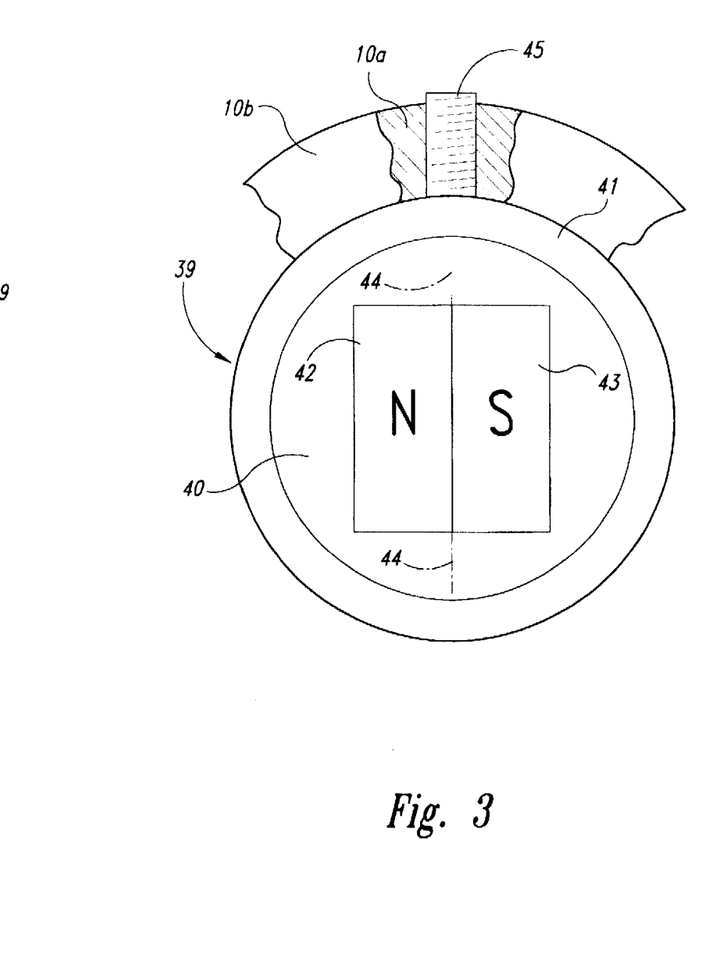
FIG. 3 is a fragmentary elevational view taken with the cover plate removed as indicated by the line 3—3 in FIG. 2.
Figures 4A, 4B:
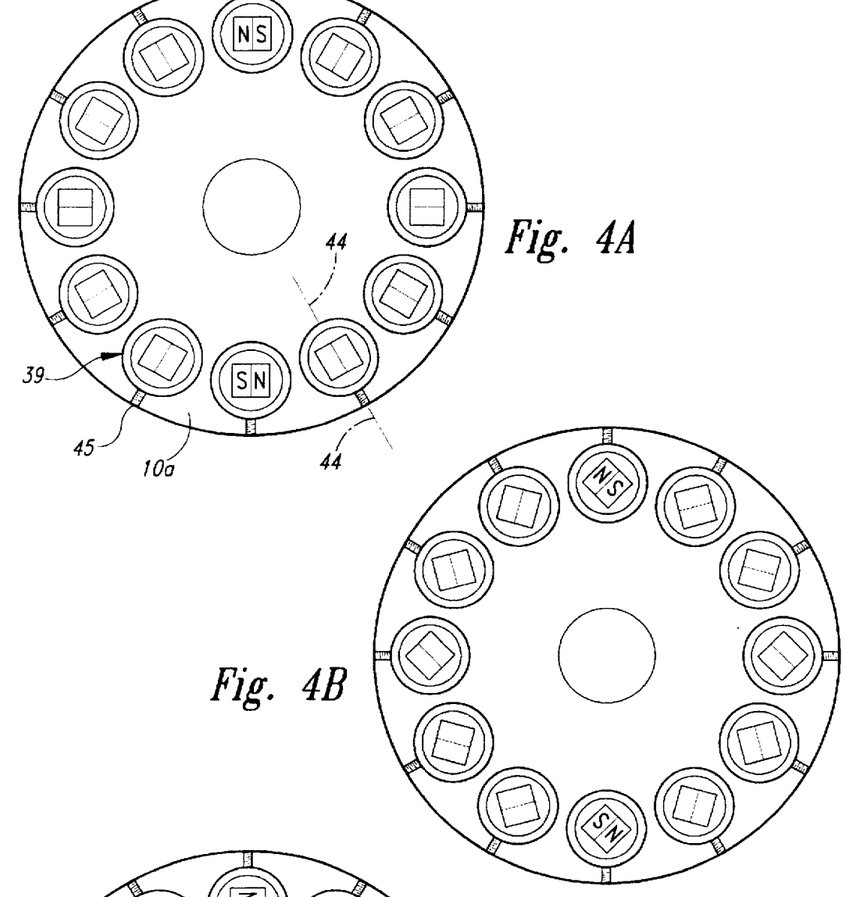
Figure 4C:
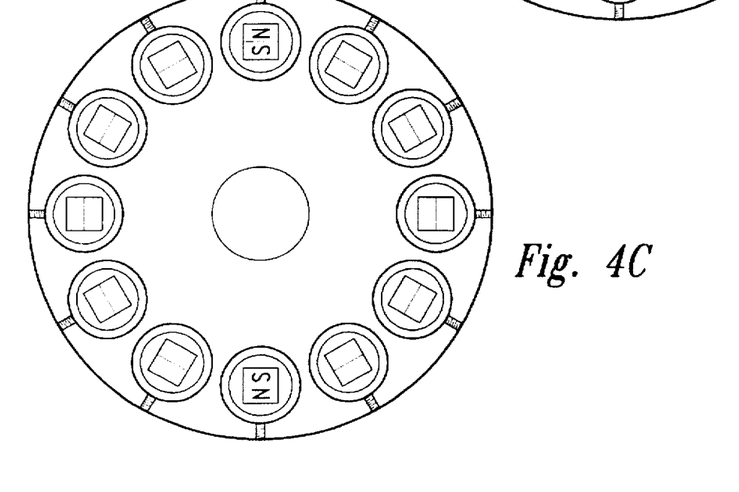
Figure 5:
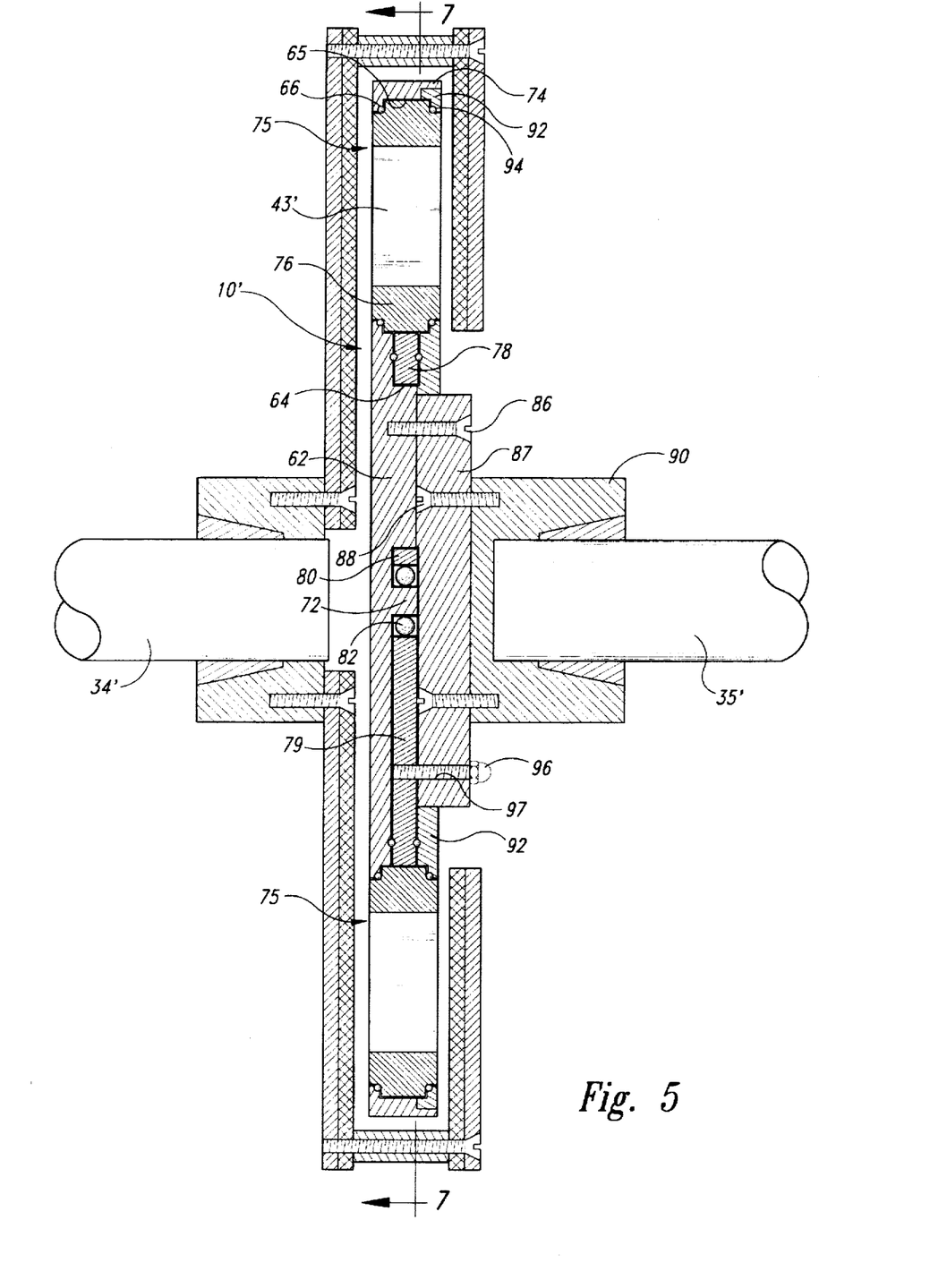
FIG. 5 is a vertical sectional view taken like FIG. 1 and showing a second embodiment of adjustable coupler.
Figure 6:
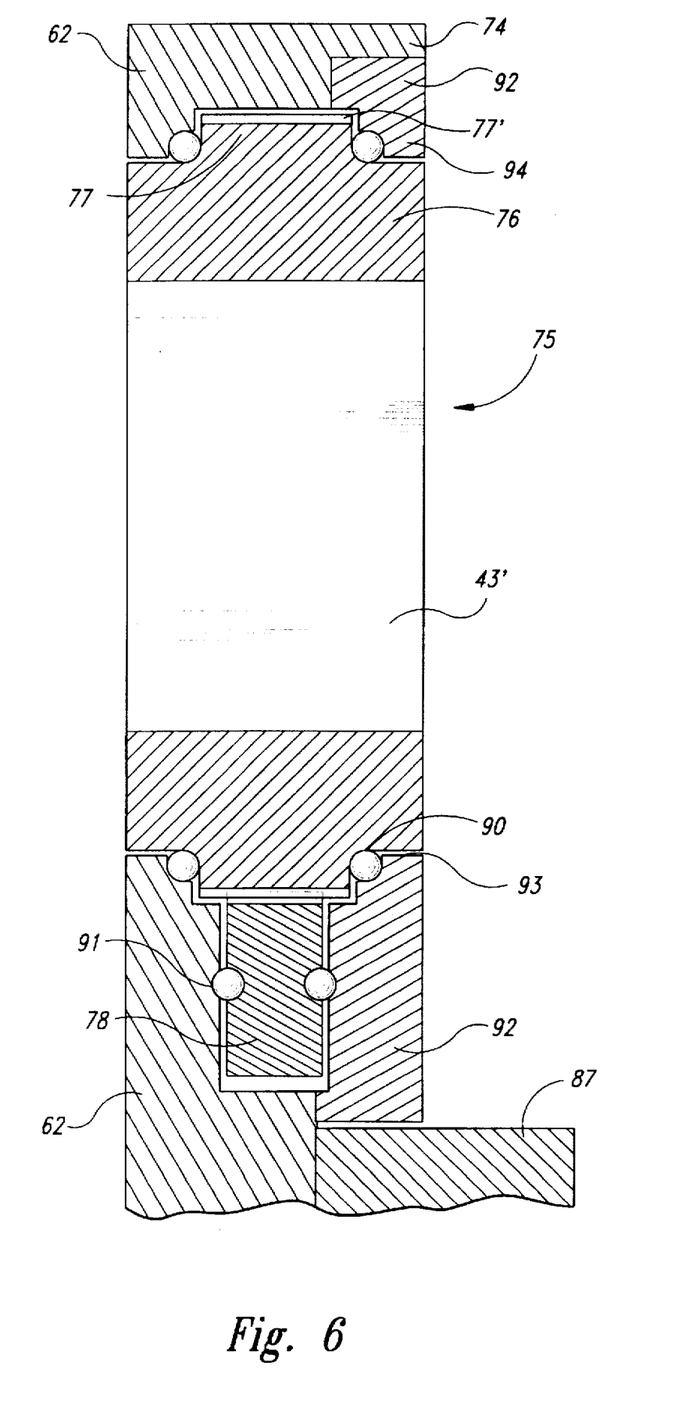
FIG. 6 is an enlarged vertical sectional view of part of the rotor as viewed in FIG. 5.
Figure 7:
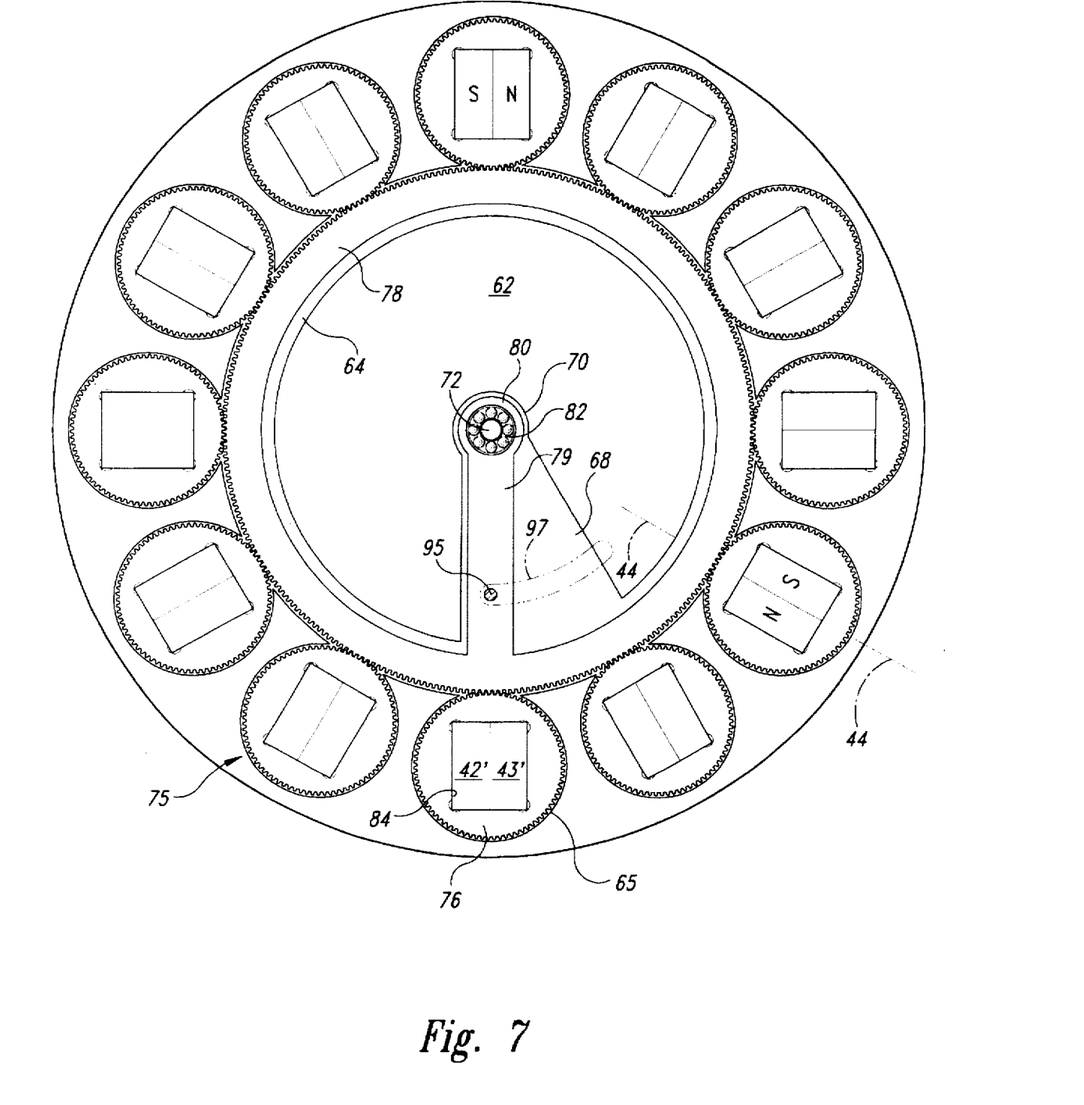
FIG. 7 is an elevational view of the magnet rotor of the second embodiment taken as indicated by line 7—7 in FIG. 5, but with the cover plate and hub plate removed, and the magnet modules in a maximum torque position.

Referring to FIGS. 5–7 showing a second embodiment, a modified magnet rotor 10' has a backing disc 62 formed with a forwardly facing annular groove 64 which is intersected at its outer periphery by a plurality of equally spaced circular pockets 65 each having an annular back retaining lip 66 of reduced diameter. The annular groove 64 is intersected by a sectorial shaped recess 68 radiating from a center groove 70 surrounding a center post 72. At its outer edge the backing disc 62 has a forwardly projecting peripheral lip 74.

Magnet modules 75 with round magnet holders 76 fit into the pockets 65. Each magnet holder is recessed at its front and back outer edges to form a planetary gear ring 77 of reduced width formed with teeth 77' meshing with a sun gear ring 78 positioned in the circular groove 64. The sun gear 78 has a spoke arm 79 radiating inwardly in the recess 68 to a hub 80 journaled on the center post 72 by ball bearing unit 82.

Each of the magnet holders 76 has a rectangular cutout 84 to receive a pair of side-by-side permanent magnets 42', 43' fixed in position and arranged so that each magnet module has a north pole and a south pole facing in each axial direction and so that the poles in each magnet are reversed relative to the corresponding poles of the other magnet. As before described, the two magnets in each magnet module have their adjacent side faces on opposite sides of a neutral plane 44 and each neutral plane is parallel to the rotary axis of the magnet rotor and extends through the rotary axis when the magnet rotor has its magnet modules in a maximum torque performance position for a given load as shown in FIG. 7.

The backing disc 62 is secured by bolts 86 to a hub plate 87 in turn connected by bolts 88 to a hub assembly 90 mounted on a keyed shaft 35'. An annular cover plate 92 fits over the exposed front face of the backing plate 62 between the outer lip 74 and the rim of the hub plate 87. The cover plate 92 has circumferentially spaced circular cutouts 93 to receive and expose the corresponding end of the magnet modules 75. These cutouts are counterbored at the rear to provide annular back retaining shoulders 94. Bearing balls 90–91 are preferably provided at the front and rear of the planetary gear rings 76 and of the sun ring 78, respectively.

The spoke arm 79 has a threaded bore 95 receiving a locking bolt 96 which projects rearwardly through an arcuate cutout 97 in the hub plate 87 so that when the locking bolt 96 is tightened the sun gear 78 is locked in position relative to the rest of the magnet rotor 10'. The arcuate cutout 97 is indicted in phantom in FIG. 7. The sectorial recess 68 in the backing plate 62 is preferably of a size permitting the spoke arm 79 to move through an angular range corresponding to a 90 degree turning of the planetary gears 77. It can be seen that manual manipulation of the locking bolt 96 permits the sun gear 78 to be turned to position the neutral planes 44 of the magnet modules in the desired torque performance position relative to the rotary axis of the magnet rotor 10'.

Figure 8:
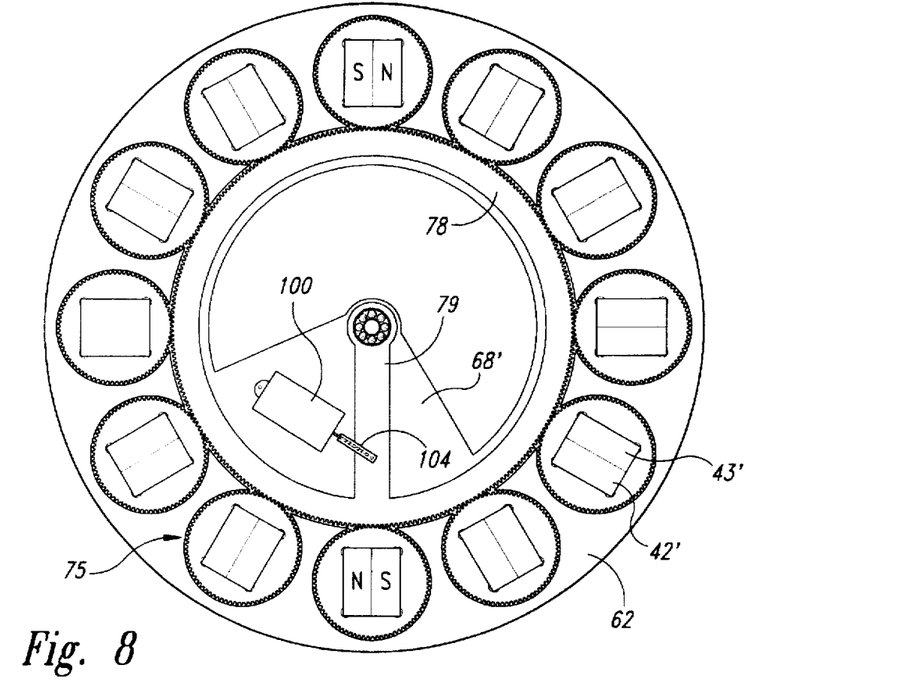
FIG. 8 is an elevational view of a magnet rotor in a third embodiment of adjustable coupler taken like FIG. 7 and the magnet modules also in a maximum torque position.

In a third embodiment, turning of the sun gear 78 for angular adjustment of the magnet modules 75 can be motorized by enlarging the recess 68 to a size 68' adequate to accommodate a reversible direct current motor 100 having a drive connection with the spoke arm 79. The depth of the recess 68' can be increased at the location of the motor 100 and the hub plate 87 can also be recessed at the motor location if necessary to allow for the thickness of the motor. The drive shaft of the motor 100 can be provided with an elongated externally-threaded extension 102 which is received by an internally threaded link 104. This link is pivotally connected at 105 to the spoke arm 79, and the motor 100 is pivotally connected at 106 to the backing plate 62. Power leads for forward and reverse operation of the motor can be passed through openings in the backing plate 62 and hub plate 87 and connected to conventional slip rings on the hub 90. These are in turn slip connected in a standard manner to terminals on stationary leads from a control module for selectively energizing the motor 100 in forward or reverse direction. With this arrangement the magnet modules can be selectively adjusted at will from a control site remote from the coupler for torque adjustment of the load.

The described non-motorized first and second embodiments of the invention permit the torque transfer ability of the coupler to be adjusted for driving a known constant load from a drive motor so that during start-up of the drive motor, there will be sufficient slip between the coupler rotors to permit the drive motor to reach full speed before the load does thereby achieving a soft start. Such a soft start requires less energy consumption and a drive motor of less horsepower than if the load were directly coupled to the drive motor at all times.

Figure 9:
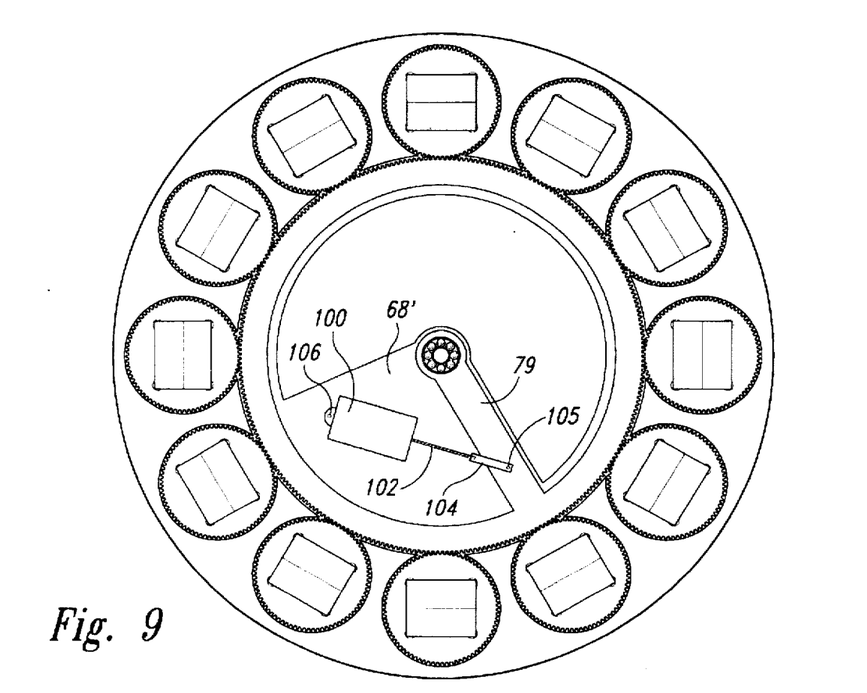
FIG. 9 is an elevational view like FIG. 8, but with the magnet modules in a minimum torque position.

The described motor-operated third embodiment arrangement provides a variable remote control of a "soft start" since the magnet modules 75 can initially be set, for example, at their minimum performance position (FIG. 9) and, then when the drive motor has achieved full speed, the magnet modules can be turned by remote control to their maximum performance position (FIG. 8).

The invention also permits the coupler to be adjusted so that speed of the load (a pump, for example) can be set at a maximum efficiency speed level while the drive motor operates at a constant higher speed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An adjustable coupler comprising:
    shaft means for establishing a rotary axis;
    a magnet unit,
    an electroconductive unit,
    said units being mounted on said shaft means so that one of said units can be rotated relative to the other unit on said rotary axis,
    said magnet unit containing multiple magnet modules spaced from said rotary axis and each presenting two magnet poles of opposite polarity facing said electroconductive unit, and spaced therefrom by an air gap, whereby torque is transferred by magnetic action responsive to rotational movement of one of said units relative to the other one of said units, said modules being turnable within openings in said magnet unit for torque adjustment.

2. An adjustable coupler comprising:

two coaxial rotary shafts;

a magnet unit, an electroconductive unit spaced by a gap from said magnet unit, said units being mounted on said shafts so that one of said units can be rotated relative to the other unit, said magnet unit containing multiple magnet modules each presenting two magnet poles of opposite polarity facing said electroconductive unit, said two magnet poles in each module being provided by two respective side-by-side permanent magnet in each module, said modules being turnable within said magnet unit for torque adjustment.

3. An adjustable coupler according to claim 2 in which said magnets in each module are mounted in a holder which is turnable within said magnet unit.

4. An adjustable coupler according to claim 3 in which each said holder has a respective gear unit operative when moved to turn the holder, and means for selectively moving said gear units a like amount, said means including a gear carried by said magnet unit which meshes with at least one of said gear units.

5. An adjustable coupler according to claim 3 in which each of said holders has a planetary gear section, and a sun gear meshing with said gear sections so as to turn each of said holders a like amount responsive to turning of said sun gear.

6. An adjustable coupler according to claim 3 in which each of said holders has a gear element, and gear means for turning said gear elements simultaneously.

7. An adjustable coupler according to claim 3 in which said holders are coupled to a motor carried by said magnet unit such as to turn said holders a like amount responsive to operation of said motor.

8. An adjustable coupler comprising:

two parallel shafts, a magnet unit, an electroconductive unit, said units being mounted on said shafts so that one of said units can be rotated relative to the other unit, said magnet unit containing multiple magnet modules each presenting two magnet poles of opposite polarity facing said electroconductive unit, said electroconductive unit presenting a respective electroconductive ring facing each end of said magnet unit and spaced by a gap from adjacent of said magnet poles, said modules being turnable within openings in said magnet unit for torque adjustment.

9. An adjustable coupler according to claim 8 in which each magnet module has two side-by-side magnets on opposite sides of a neutral plane parallel to said rotary axis, said two magnets each having their poles reversed relative to relative to the poles of the other of said two magnets.

10. An adjustable coupler comprising:

shaft means establishing a rotary axis;

a magnet unit, an electroconductive unit, said units being mounted on said shaft means so that one of said units can be rotated relative to the other unit on said rotary axis, said magnet unit containing multiple magnet modules each presenting two magnet poles of opposite polarity facing said electroconductive unit, said electroconductive unit presenting a respective electroconductive ring facing each end of said magnet unit and spaced by a gap from adjacent of said magnet poles, said modules being turnable within openings in said magnet unit for torque adjustment, and a motor mounted on said magnet unit and having a drive interconnection with each of said modules whereby operation of said motor turns each of said modules a like amount.

11. An adjustable coupling according to claim 10 in which said units are journal-mounted to rotate on coaxial rotary axes, and control means are provided for remotely controlling operation of said motor.

12. An adjustable coupler according to claim 10 in which said motor is electric and is powered from an electric power source remote from said magnet unit.

13. An adjustable coupler according to claim 10 in which said motor is electric and powered from a battery carried by said magnet unit.

14. An adjustable coupler comprising:

two parallel rotary shafts, a magnet unit, an electroconductive unit, said units being mounted on said shafts so that one of said units can be rotated relative to the other unit, said magnet unit containing multiple magnet modules each presenting two magnet poles of opposite polarity facing said electroconductive unit, said electroconductive unit presenting a respective electroconductive ring facing each end of said magnet unit and spaced by a gap from adjacent of said magnet poles, said modules being turnable within openings in said magnet unit for torque adjustment, and means on said magnet unit for keeping said modules in adjusted position relative to one another.

15. An adjustable coupler comprising:

two coaxial shafts each having a rotary axis, a magnet unit, an electroconductive unit spaced by a gap from said magnet unit, said units being independently mounted on respective of said shafts for rotation relative to one another on said rotary axis, said magnet unit containing multiple magnet modules each presenting two magnet poles of opposite polarity facing said electroconductive unit, and said magnet modules being mounted to turn for torque adjustment within openings in said magnet unit about respective module axes which are parallel to said rotary axis and equally spaced therefrom.

16. An adjustable coupler according to claim 15 in which said magnet unit has a sun gear mounted to turn relative to said magnet unit about said rotary axis, and gears for coupling said sun gear to said modules for turning the modules a like amount responsive to turning of said sun gear.

17. An adjustable coupler comprising:

two rotary shafts mounted for rotation about a rotary axis, a magnet unit mounted on one of said shafts for rotation about said rotary axis, and an electroconductive unit mounted on the other of said shafts for rotation independently of said magnet unit about said rotary axis and having a non-ferrous electroconductive ring centered on said rotary axis and backed by a ferrous element, said magnet unit containing a magnet module with poles spaced by an air gap from said electroconductive ring, said module being turnable within the magnet unit about a module axis spaced from and parallel to said rotary axis, said module having a position wherein torque is transferred by magnetic action responsive to rotational movement of one of said units relative to the other of said units.

18. An adjustable coupler comprising:

two rotary shafts each having a rotary axis, a magnet unit mounted on one of said shafts for rotation about its rotary axis, and an electroconductive unit mounted on the other of said shafts for rotation independently of said magnet unit about its rotary axis, said magnet unit containing a magnet module turnable within an opening in the magnet unit about a module axis spaced from and parallel to said rotary axis of the magnet unit, said magnet module having two side-by side-permanent magnets on opposite sides of said module axis and presenting poles of opposite polarity spaced by a gap from said electroconductive unit.

19. An adjustable coupling comprising:

a magnet unit mounted for rotation about a rotary axis, an electroconductive unit mounted for rotation independently of said magnet unit about a rotary axis, said magnet unit containing multiple magnet modules spaced by a gap from said electroconductive unit and each turnable within a respective opening in the magnet unit about a respective module axis spaced from and parallel to said rotary axis of the magnet unit, said magnet modules being equally spaced from the rotary axis of the magnet unit and equally spaced from one another, and rotary shafts for said units centered on said rotary axes.

20. An adjustable coupler comprising:

a shaft having a rotary axis, a magnet unit mounted for rotation about said rotary axis, and an electroconductive unit mounted for rotation independently of said magnet unit about said rotary axis, said magnet unit containing a magnet module spaced by a gap from said electroconductive unit and turnable within an opening in the magnet unit about a module axis spaced from and parallel to said rotary axis of the magnet unit, and a motor on said magnet unit having a drive connection to said module for turning said module when the motor is activated.

\* \* \* \* \*